J. J. MOLLOY.
BARLEY OR RICE HULLER.
APPLICATION FILED APR. 10, 1915.

1,170,839.

Patented Feb. 8, 1916.
2 SHEETS—SHEET 1.

WITNESSES:
L. J. Forde
Thos. Eastberg

INVENTOR
John J. Molloy
BY G. H. Strong.
ATTORNEY

UNITED STATES PATENT OFFICE.

JOHN J. MOLLOY, OF STOCKTON, CALIFORNIA.

BARLEY OR RICE HULLER.

1,170,839.  Specification of Letters Patent.  Patented Feb. 8, 1916.

Application filed April 10, 1915. Serial No. 20,442.

*To all whom it may concern:*

Be it known that I, JOHN J. MOLLOY, a citizen of the United States, residing at Stockton, in the county of San Joaquin and State of California, have invented new and useful Improvements in Barley or Rice Hullers, of which the following is a specification.

This invention relates to grain hullers and particularly to barley and rice pearlers.

It is an object of this invention to provide a simple, practical, automatic-feed continuously operating hulling machine of high efficiency in capacity and cleanness of product particularly designed for handling rice.

A further object is to provide a huller in which the quantity of the discharge may be readily and accurately controlled and whereby the degree of pressure of the grain in transit is regulated and maintained uniform.

The invention consists of the parts and the combination and construction of parts as hereinafter more fully described and claimed, having reference to the accompanying drawings, in which—

Figure 1:
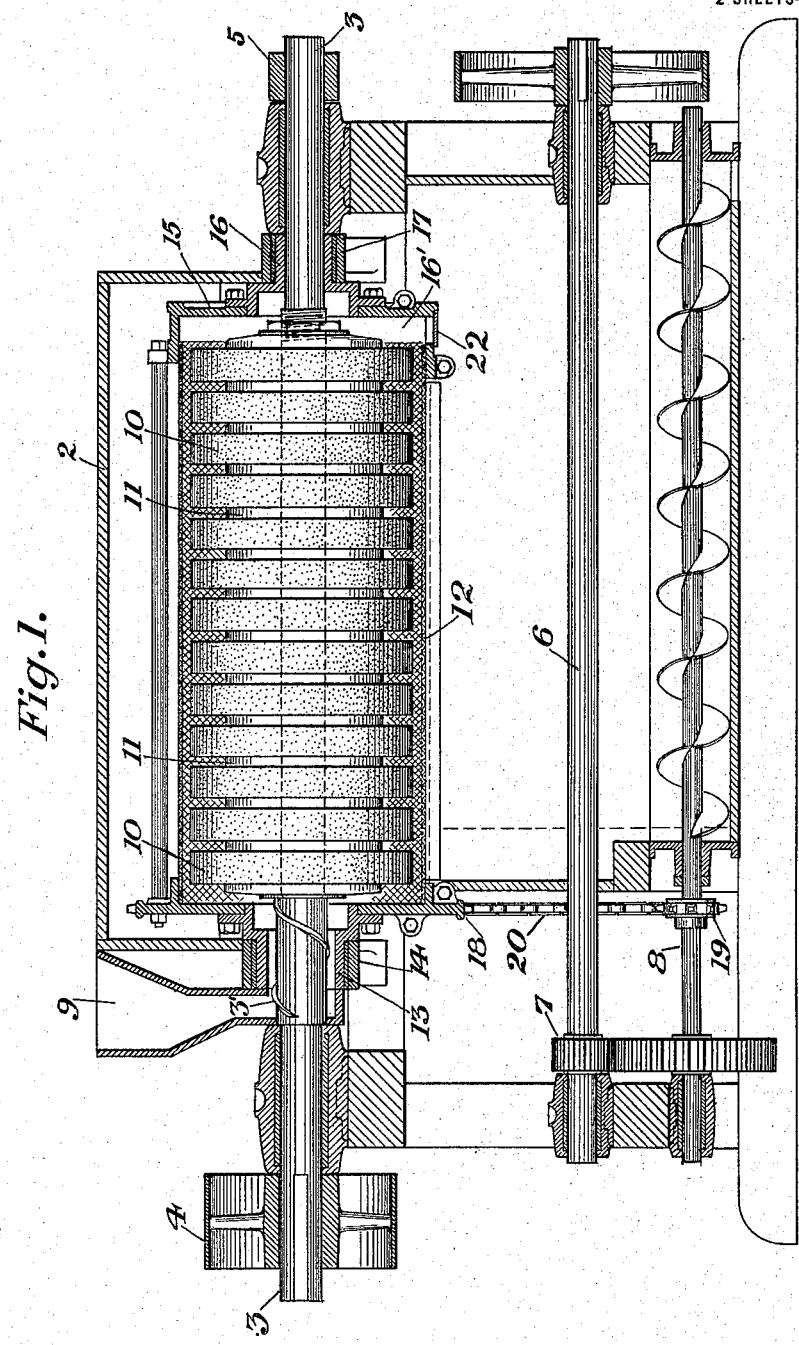
Figure 2:
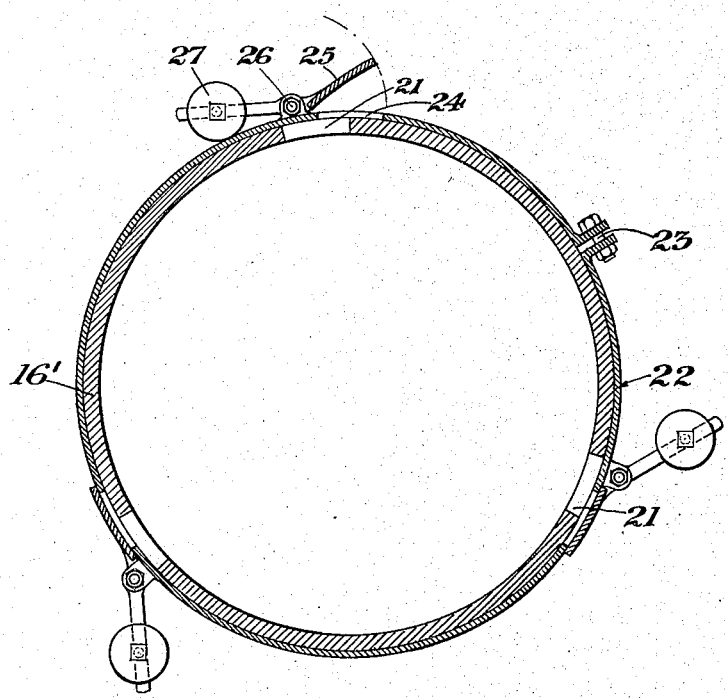

Figure 1 is a central longitudinal vertical section through the machine. Fig. 2 is a sectional detail of the adjustable discharge means.

2 indicates a housing for the hulling mechanism. The latter includes a main shaft 3 with a drive pulley 4 at one end and a transmission pulley 5 belted to an intermediate shaft 6 which is, in turn, geared at 7 to an auger shaft 8 for conveying off the hulled grain.

The shaft 3 is provided with a shallow spiral thread or feeder 3', starting at the feed hopper 9 of the housing and terminating at the first of a set of abrasion wheels 10, each fixed securely on the shaft 3. The wheels 10 are separated so as to produce a side space 11 between each into which the grain flows during transit. The wheels 10 travel at high speed and are collectively inclosed in a cylindrical screen 12 having a tubular hub 13 at the feed end and encompassing the feed screw 3' and supported in a journal 14. The opposite end of the screen 12 is closed by a head 15 with a hub 16 turnably fitting the shaft 3 and supported in a bearing 17. On the feed end of the screen is secured a sprocket wheel 18 geared down to a sprocket pinion 19, on the auger 8, by a chain 20, and driving the screen slowly in opposite direction to the hulling wheels 10. When grain is fed into hopper 9 the screw 3' regularly feeds it into the screen where it accumulates to the desired depth. An important feature tending toward the great efficiency of thorough, rapid hulling is the arrangement of the wheels 10 to present a multitude of angular corners which, do a great deal of the work. The mobile grain tends to flow into the spaces between the wheels and is therefore abraded by the side area of each wheel. The chaff or hulls are constantly tumbled and discharged by the screen and showered by the flying solid kernel impelled by the fast running wheels 10.

The discharge of the kernel at the head 15 of the cylinder is permitted by the following means: The head has a cylindrical portion 16' which is perforated at 21 at suitable angular intervals and about this is fitted a slidable band 22 with a fastener 23. The band is provided at 24 with apertures or gateways one for each opening 21. By shifting the band on the head the openings 21 may be uncovered or partly covered to regulate discharge through the openings 24 of the band. Each gateway is provided with an automatic shutter or gate 25 pivoted on the band at 26 and having a weight 27. As the screen slowly revolves each gate 25 is automatically closed by its weight during traverse of a predetermined arc about the axis of the cylinder. As the gates swing through a given arc above the axis of the cylinder gravity acts on the weights 27 and opens the gates. During the interim in which the gates are open the heavy kernels are thrown out centrifugally by reaction of the disks or wheels 10. The closed gates keep the material from discharging at the openings passing below the axis of the cylinder.

This machine is automatically and continuously fed, the material traveling across the face of each stone and crowded in between them. This space between the stones is more essential than the surface on the face of the stone for two reasons: first, by having approximately two inches of side surface I get practically twenty-six inches more of area; there being thirteen stones in each machine and the space between them is exposed to the grain for two inches; second, the pressure on the material while it is between the cylinder and stone is equal at all times, which is very essential and cannot be done by charge and discharge or intermittent mills.

On the old style barley pearlers the moment the barley is between the stone and case the pressure is great but as the stock is worn down and discharged through the perforated jacket the stock gets less and consequently the pressure less. With my machine there is the same amount of stock between the cylinder and stone at all times and as the stone grinds the hull off it is discharged through the perforated jacket, leaving only the material that is to be worked on in the cylinder. At the end of the cylinder it is automatically discharged and the amount of pressure that is brought to bear upon the stock while it is being worked on is controlled by the series of valves at the discharge end of the machine. These valves may be set to cause any pressure desired and when they are once set they are absolutely automatic in their action.

Having thus described my invention what I claim and desire to secure by Letters Patent is—

1. An attrition device for rice or barley hullers, comprising a set of rotatively mounted axially alined and parallel spaced attrition disks, an incasing cylindrical screen for the grinders, means for regularly and continuously feeding stock to the grinding and screening elements, and variable automatic gravity operated gates for permitting the constant discharge of the hulled kernel.

2. A rotary barley and rice huller comprising a continuously operative attrition means, and variable discharge gates automatically opened through an arc above the axis of the huller.

3. A rotary barley and rice huller comprising a continuously operative attrition means, and means for automatically discharging material by centrifugal force through a predetermined arc above the axis of the huller, and means for regulating the period of discharge.

4. A barley and rice huller comprising a rotative cylindrical screen with a feeder at one end and rotating centrifugal discharge means at the other operative through an arc above the axis of the huller, and a coaxial attrition device in said screen for abrading the stock in transit therein.

5. A continuously operative grain huller comprising coactive attrition and screening means, and means for maintaining a predetermined quantity of stock in transit therein to produce the desired pressure of the grain upon the attrition means, said latter means including an adjustable band structure for varying and fixing the rate of discharge, and for regulating the period of discharge.

6. A continuously operative grain huller comprising coactive attrition and screening means, means for maintaining a predetermined quantity of stock in transit therein to produce the desired pressure of the grain upon the attrition means, said latter means including an adjustable band structure for varying and fixing the rate of discharge, and for regulating the period and the location of discharge, and gravity operated gates carried by said band structure.

7. A grain huller comprising a continuously operative attrition means, automatic axially disposed feed means, and automatically operated discharge means in the periphery of said huller operative to discharge material through a variable arc above the axis of said huller.

8. A grain huller having feed means adjacent one end thereof, continuously operative attrition means, discharge means, and an adjustable band for regulating the discharge through said means.

9. A grain huller having feed means adjacent one end thereof, continuously operative attrition means, discharge means adjacent the other end thereof, an adjustable band surrounding said huller, and automatically operated discharge gates carried by said band.

In testimony whereof I have hereunto set my hand in the presence of two subscribing witnesses.

JOHN J. MOLLOY.

Witnesses:
A. O. KUEHMSTED,
GEORGE R. McLEOD.

Copies of this patent may be obtained for five cents each, by addressing the "Commissioner of Patents, Washington, D. C."